(12) United States Patent
Kaiser et al.

(10) Patent No.: US 7,865,887 B2
(45) Date of Patent: Jan. 4, 2011

(54) CONTEXT BASED EVENT HANDLING AND EXECUTION WITH PRIORITIZATION AND INTERRUPT MANAGEMENT

(75) Inventors: Matthias U. Kaiser, Mountain View, CA (US); Keith S. Klemba, Palo Alto, CA (US); Shuyuan Chen, Palo Alto, CA (US); Frankie James, Sunnyvale, CA (US)

(73) Assignee: SAP AG, Walldorf (DE)

( * ) Notice: Subject to any disclaimer, the term of this patent is extended or adjusted under 35 U.S.C. 154(b) by 1070 days.

(21) Appl. No.: 11/606,701

(22) Filed: Nov. 30, 2006

(65) Prior Publication Data

US 2008/0133812 A1 Jun. 5, 2008

(51) Int. Cl.
G06F 9/45 (2006.01)
(52) U.S. Cl. .................. 717/161; 717/124; 717/127; 709/224; 719/314
(58) Field of Classification Search .............. 717/124, 717/127, 161; 719/314, 318; 709/224, 250
See application file for complete search history.

(56) References Cited

U.S. PATENT DOCUMENTS

| | | | | |
|---|---|---|---|---|
| 5,691,917 | A | * | 11/1997 | Harrison ............... 717/127 |
| 5,774,729 | A | * | 6/1998 | Carney et al. ............ 717/126 |
| 5,802,263 | A | | 9/1998 | Dittmar et al. |
| 6,334,142 | B1 | | 12/2001 | Newton et al. |
| 6,757,712 | B1 | | 6/2004 | Bastian et al. |
| 7,035,634 | B2 | | 4/2006 | Mead et al. |
| 7,185,046 | B2 | | 2/2007 | Ferstl et al. |
| 7,231,428 | B2 | | 6/2007 | Teague |
| 7,317,697 | B2 | | 1/2008 | Lewis et al. |
| 7,444,383 | B2 | | 10/2008 | Horvitz |
| 7,461,382 | B2 | * | 12/2008 | Hammerich et al. ....... 719/318 |
| 7,519,602 | B2 | | 4/2009 | Klemba |
| 2001/0036822 | A1 | | 11/2001 | Mead et al. |
| 2001/0036823 | A1 | | 11/2001 | Van Lieshout et al. |
| 2002/0006112 | A1 | | 1/2002 | Jaber et al. |
| 2002/0152315 | A1 | | 10/2002 | Kagan et al. |

(Continued)

FOREIGN PATENT DOCUMENTS

EP 1263233 A2 12/2002

(Continued)

OTHER PUBLICATIONS

K Jeffay, DL Stone, Accounting for interrupt handling costs in dynamic priority task systems; Proceedings of the 14th IEEE Real-Time Systems, 1993, pp. 1-10.*

(Continued)

*Primary Examiner*—Wei Y Zhen
*Assistant Examiner*—Satish Rampuria
(74) *Attorney, Agent, or Firm*—Fountainhead Law Group PC (57) ABSTRACT

Embodiments of the present invention provide improved event handling between systems. In one embodiment, the present invention includes software event handling method comprising receiving a first event from a first source system in a plurality of source systems, the first event including event information, accessing context information corresponding to the first event, generating a second event based on at least a portion of the event information and context information using one or more rules, assigning a priority to the second event, and sending the second event to a first target system in a plurality of target systems.

28 Claims, 5 Drawing Sheets

U.S. PATENT DOCUMENTS

| | | |
|---|---|---|
| 2002/0184223 A1 | 12/2002 | Miura |
| 2003/0041107 A1 | 2/2003 | Blattner et al. |
| 2003/0087638 A1 | 5/2003 | Taylor |
| 2003/0126308 A1* | 7/2003 | Kim .......................... 709/318 |
| 2003/0227392 A1 | 12/2003 | Ebert et al. |
| 2004/0024849 A1 | 2/2004 | El-Beik |
| 2005/0065977 A1 | 3/2005 | Benson et al. |
| 2005/0273497 A1 | 12/2005 | Patrick et al. |
| 2006/0015603 A1* | 1/2006 | Jakobson et al. ............ 709/223 |
| 2006/0031407 A1 | 2/2006 | Dispensa et al. |
| 2006/0069946 A1 | 3/2006 | Krajewski et al. |
| 2006/0178997 A1 | 8/2006 | Schneck et al. |
| 2006/0190610 A1 | 8/2006 | Motegi et al. |
| 2007/0073845 A1 | 3/2007 | Reisman |
| 2007/0112811 A1 | 5/2007 | Shen et al. |
| 2008/0263086 A1 | 10/2008 | Klemba et al. |

FOREIGN PATENT DOCUMENTS

| | | |
|---|---|---|
| WO | 98/47268 A1 | 10/1998 |
| WO | 00/14987 A1 | 3/2000 |
| WO | 02/35359 A2 | 5/2002 |
| WO | 03/100640 A1 | 12/2003 |
| WO | 2006/063868 A1 | 6/2006 |

OTHER PUBLICATIONS

Ziliaskopoulous et al., "An Internet-based Geographic Information System that Integrates Data, Models and Users for Transportation Applications", Transportation Research Part C (Aug. 2000), pp. 427-444.

Durr et al., "SITS: A System for Uniform Intermodal Freight Transport Information Exchange", International Journal of Transport Management, Dec. 1, 2003, pp. 175-186.

European Search Report (from a corresponding foreign application), EP 07024166.6, mailed Aug. 1, 2008.

* cited by examiner

CONTEXT BASED EVENT HANDLING AND EXECUTION WITH PRIORITIZATION AND INTERRUPT MANAGEMENT

BACKGROUND

The present invention relates to managing the interactions between devices and systems, and in particular, to context based event handling and execution with prioritization and interrupt management.

Unless otherwise indicated herein, the approaches described in this section are not necessarily all prior art to the claims in this application and are not admitted to be prior art by inclusion in this section.

With the growth of computer networks, more and more devices and systems are capable of working together by sharing information to perform their respective functions and enhance the computing experience. For example, a variety of different types of devices and systems may generate outputs that may be used by other devices or systems or receive inputs from other devices or systems that may be used to enhance functionality. With the growing prevalence of computer networks, devices and systems from complex software application, web servers, and other forms of intelligent computing systems to simple devices such as temperature sensors, lamps, or a variety of other simple actuators can all potentially receive or transmit data across a shared communication framework.

However, the convergence of complex intelligent computer systems with simple electronic devices onto a common communication framework gives rise to a variety of challenging problems. For example, managing interactions between systems and devices with a wide range of functionalities can be extraordinarily complex. In particular, managing the flow of information between such a wide range of system and device types would require the ability to integrate a correspondingly wide range of events occurring on each type of system or device. For example, complex computing systems may communicate events with a wealth of information that may be used to manage communications and activities between systems. However, different computing systems may include drastically different information in events. Additionally, simple devices may communicate events in a relatively primitive manner with very little information, but the information contained in such events may be critical to the performance of the fully integrated system. Accordingly, it is desirable to have a system that can integrate the flow of events between a wide variety of systems and devices.

In addition to overcoming the problems associated with event handling, integrating different systems and devices may require an intelligent approach to how the information in each event is used to optimize the execution of resources available across the distributed environment. For example, it may be desirable for different components to communicate with each other rather than just sequentially processing the results of preceding components. Accordingly, it is desirable to have a system that can intelligently integrate the functionality of a wide variety of computing systems and electronic devices.

Thus, there is a need for improved techniques of managing the interactions between devices and systems. The present invention solves these and other problems by providing context based event handling and execution with prioritization and interrupt management.

SUMMARY

Embodiments of the present invention provide improved event handling between systems. In one embodiment, the present invention includes software event handling method. In one embodiment, the present invention includes a computer-readable medium containing instructions for controlling a computer system to perform a method. In one embodiment, the present invention includes a method comprising receiving a first event from a first source system in a plurality of source systems, the first event including event information, accessing context information corresponding to the first event, generating a second event based on at least a portion of the event information and context information using one or more rules, assigning a priority to the second event, and sending the second event to a first target system in a plurality of target systems.

In one embodiment, the event information comprises event content and other information about the event.

In one embodiment, the second event is generated and the priority is assigned based on the content of the first event.

In one embodiment, the method further comprises checking the event information and verifying the validity of the first event.

In one embodiment, the method further comprises parsing the event information into a plurality of components and providing one or more of the components as inputs to the one or more rules.

In one embodiment, the rules comprise semantic mappings.

In one embodiment, a first plurality of rules receive at least a portion of event information and context information, and in accordance therewith, generate results, and wherein the results are processed by one or more second rules to generate the second event and assign said priority to the second event.

In one embodiment, priority is assigned based on at least a portion of the event information and context information.

In one embodiment, the method further comprises storing a value corresponding to the second event in a memory location indicating that the second event is waiting to be executed.

In one embodiment, the method further comprises storing a first value corresponding to the second event in a first memory location indicating that the second event is executing.

In one embodiment, the first memory location corresponds to the first target system.

In one embodiment, the method further comprises generating a third event having a higher priority than the second event, wherein if the second event is executing, the first value corresponding to the second event is stored in a second memory location indicating that the second event has been interrupted, and a second value corresponding to the third event is stored in the first memory location.

In one embodiment, the method further comprises updating the activity status of the source system.

In one embodiment, the method further comprises checking the activity status of the first target system before sending the second event to the first target system.

In one embodiment, the method further comprises associating the first source system, a first target system, and a constraint, wherein events received from the first source system are sent to the associated first target system if the constraint is satisfied.

In one embodiment, the constraint assigns said priority to the second event.

In one embodiment, the method further comprises converting the second event to conform to a protocol of the first target system.

In another embodiment, the present invention includes an event handling system comprising an event detector for receiving first events from a plurality of source systems, the first events comprising event information, a context repository for storing context information, an event interpreter for receiving event information and context information, and in accordance therewith, generating second events and assigning priority to the second events based on at least a portion of the event information and context information, and a dispatch component for sending the second events to one or more designated target systems.

The event handling system of claim further comprising an interrupt handler, and a first queue for storing first values corresponding to events waiting to be executed, a second queue for storing second values corresponding to events that are executing on target devices, and an third queue for storing third values corresponding to events that have been interrupted by higher priority events.

In one embodiment, the system further comprises a rule execution engine and a plurality of rules, the rule execution engine receiving components of the event information and context information, and in accordance therewith, generating results.

In one embodiment, the system further comprises a plurality of interpretation rules for generating the second events and assigning priority based on event information, context information, or the results from the rule execution engine.

The following detailed description and accompanying drawings provide a better understanding of the nature and advantages of the present invention.

DETAILED DESCRIPTION

Described herein are techniques for providing event handling. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
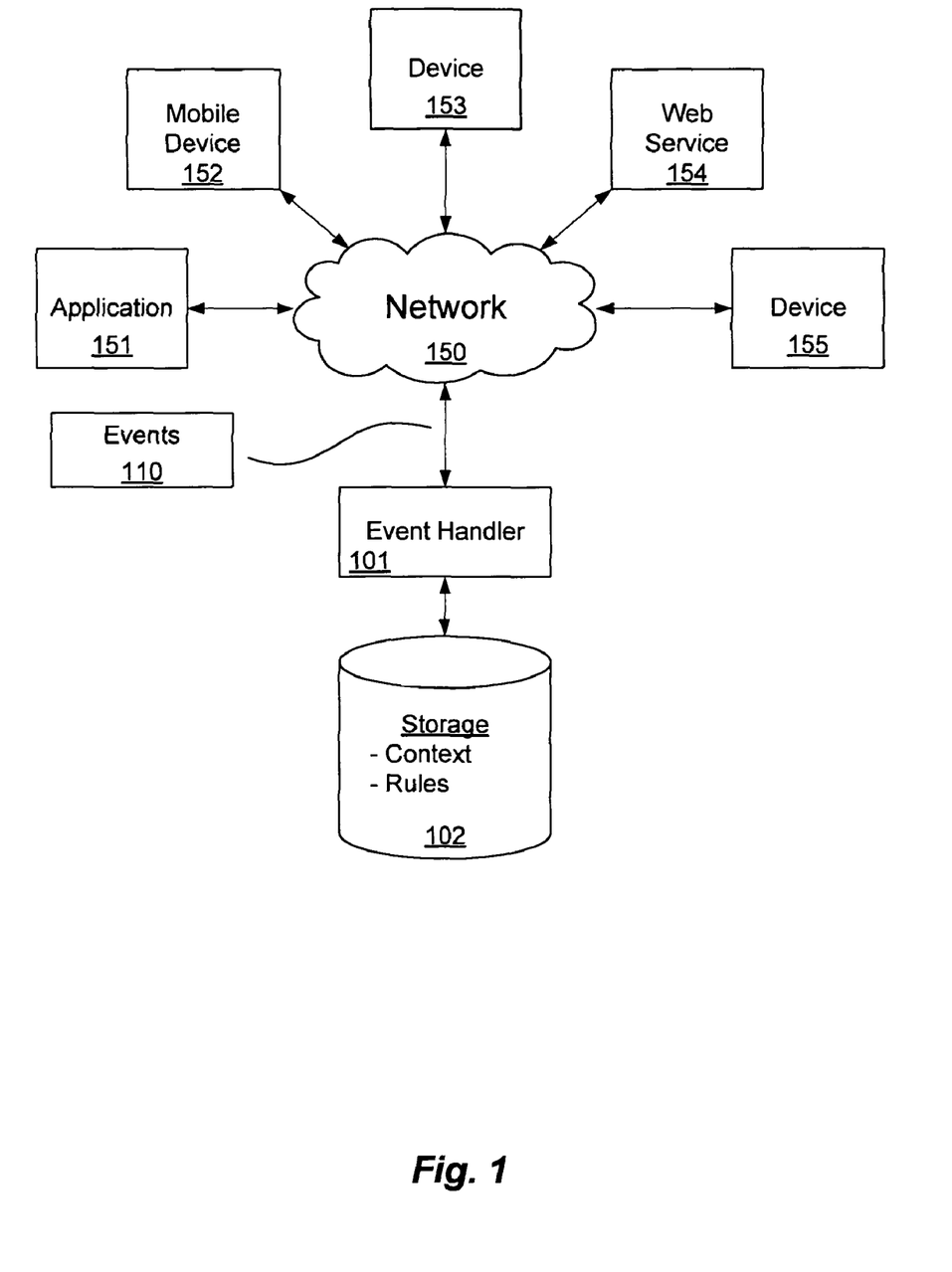
FIG. 1 illustrates a distributed system including an event handler according to one embodiment of the present invention.

FIG. 1 illustrates a distributed system including an event handler according to one embodiment of the present invention. Event handler 101 may be coupled to a variety of electronic systems over a communication framework such as network 150. Network 150 of FIG. 1 may represent a number of distinct computer networks or communication mediums. For example, network 150 may include the Internet, one or more wireless networks, local area networks, wide area networks, or a variety of communication buses for exchanging information with electronic devices or subsystems (e.g., sensors or other actuators). Event handler 101 may integrate the resources of multiple types of hardware and/or software systems. For example, event handler 101 may receive a variety of events 110 from systems including but not limited to software applications 151, mobile devices 152, web services 154, or simple electronic devices (e.g., actuators) 153 and 155. Events sent or received from each system over network 150 may include particular content (e.g., a message) and additional information relating to the event (collectively, "event information"). For example, events may include information identifying the source of the event (i.e., the source device), event type, priority information, or activity status of the device generating the event (e.g., busy or idle), for example. Event handler 101 may be coupled to information storage 102, which stores information including context information and rules, which may be used for processing the received event and generating other events. Some embodiments of the present invention process events based on context associated with the event. In one embodiment, rules may be applied and results generated based on the event information and context associated with systems or devices generating the events, for example. Other events may be generated by event handler 101 in response to receiving and processing events and associated context.

As mentioned above, different systems may create different types of events including a wide variety of event information. Event handler 101 may detect events generated by the different systems and access context information corresponding to the detected event. Event handler 101 may include an interpreter that generates other events based on the content and context of an event, and may assign a priority to the generated event based on the event information and context information, for example. The generated events may be sent to other systems (or back to the same system) for performing specified functions. In one embodiment, event handler 101 includes a rule base, and received events are interpreted based on content and context applied to one or more rules in the rule base and analysis of the results from the applied rules. As described in more detail below, a rule engine may be used for accessing and applying rules against event content and context. The rule engine may include semantic mappings between the content/context and results that may be used by the interpreter to make decisions (e.g., generating other events) based on the received events. In one embodiment, events generated by event handler 101 are managed in different storage locations based on the status of the event. For example, events may be referenced in memory as follows: events that are waiting to be executed, events that are currently executing on another system, or events that have been interrupted.

Figure 2:
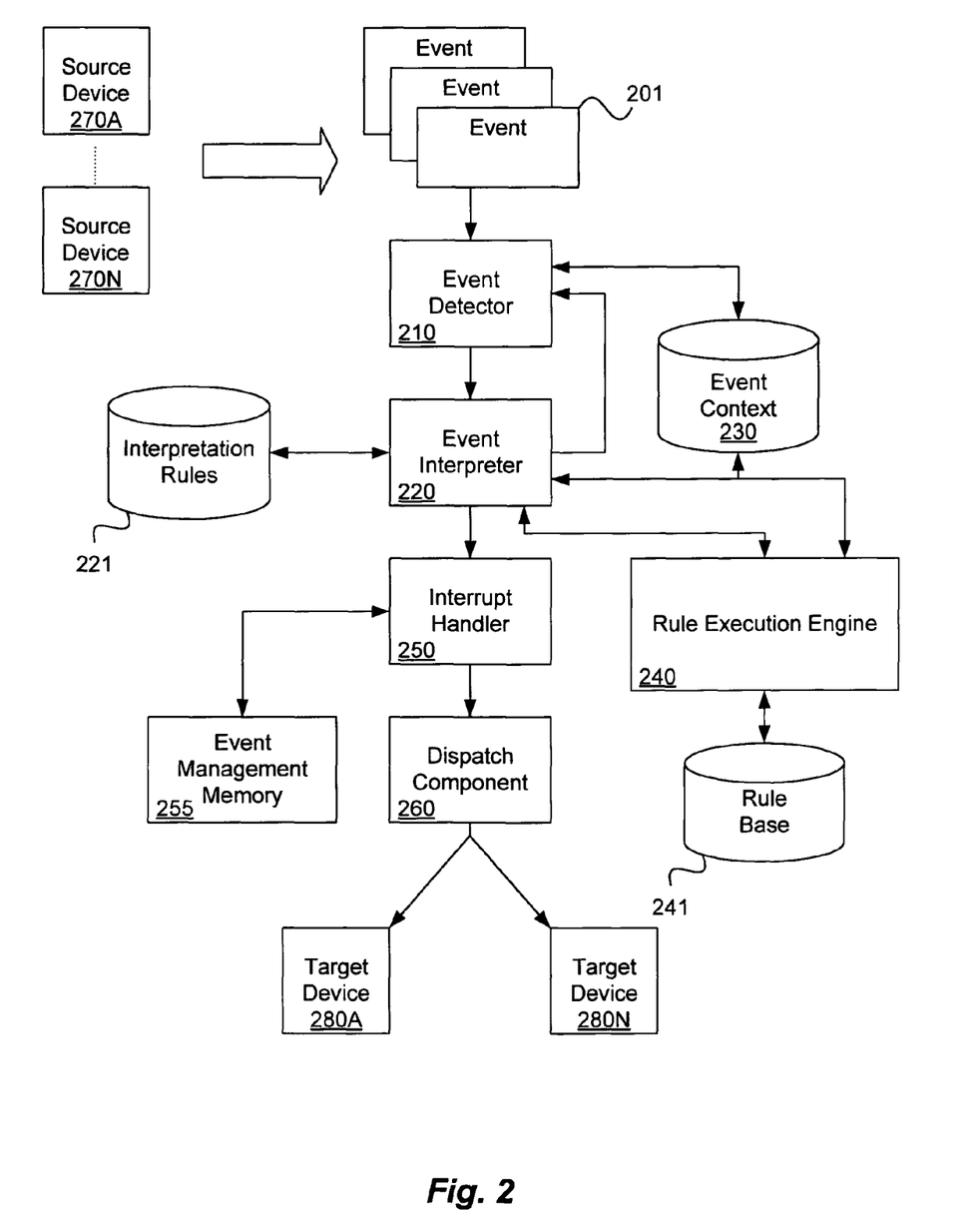
FIG. 2 illustrates an example architecture of an event handler according to one embodiment of the present invention.

FIG. 2 illustrates an example architecture of an event handler according to one embodiment of the present invention. A plurality of source devices 270A-270N may generate events 201. Source devices may range from complex intelligent computing systems or software applications to simple electronic components or devices such as sensors, lights, or other forms of simple actuators (e.g., micro-switches, relays, the presence of a file or service call, etc.). Based on the nature of the source device, different events may include different event information in potentially different formats. Some events may include large amounts of information, including both event content and information about the event (e.g., event metadata). Event information may include, for example, information specifying the source of the event, information about the source device such as the activity status of the source device (e.g., busy, idle, sleeping, processing), event type (e.g., email, instant message, document, status report, alarm), information about the content of the event (e.g., information about the event message itself), information about the destination, information about the route, and information about the priority of the event. It is to be understood that a variety of event information may be sent by different devices. In some applications, events received from one or more source devices may include very little information. For example, a simple actuator may generate an event that includes an event description and provides one or more pieces of data (content). An example event from a temperature sensor may be of the form "TEMP_MEASURE X", where X is a numerical data value for the temperature measured by the sensor.

Events may be received and detected by event detector 210. It can be seen that the event detectors according to embodiments of the present invention may receive a variety of events that may be very different. Event detector 210 may detect events and receive the event information. In one embodiment, event detector 210 may translate event information from a variety of formats into a common format. Event detector 210 may receive event information and create software structures for storing the received event information. These internal structures may be used by other event handling components to process the event, for example. In one example embodiment, event detector 210 receives the event information and instantiates an event object, which includes attributes populated by event information.

Event detector 210 may be coupled to a storage location to access context information. Context information (or just "context") is information that may be associated with an event to provide more information to the system about how the event should be processed and what events should be generated in response to received events. Example context may include information about the source device such as the driver of a vehicle, the owner of a cell phone, or history information such as prior event information received from a particular source device or historical content (data) received from the source device (e.g., the last 10 or 20 readings received from a sensor). Context for different sources may vary depending on the type of source. For example, context for a software application may include time of application, version of application, client interacting with the application, available processing sources (e.g. databases) for the application, country/region of operation of the application (triggering complex context variants). An application may be composed of services and thereby be a composite service where the above example may be applicable. For a software service the context is may include preconditions (e.g., available data from databases or previously produced by other services), rules modifying the functionality of a service (e.g., resulting from time or region of execution of the service), requirements of the service environment (e.g., in which format is the result to be delivered for the further execution of other services), platform dependency (e.g., the operating system a service is executed), the communication language (e.g., wsdl or others) in which communication happens with the service. For a mobile device, context may include battery status, connectivity status, devices the mobile device is able to communicate with, activity status (busy or idle), time/location of the device, or certain other internal states (e.g., if a car is a mobile device, is it in drive mode or in park mode).

Context for an event may be accessed by the event detector and forwarded to other parts of the system to make decisions. For example, context for a particular event from a particular device may be accessed by event detector 210 and associated with the event during event handling. The context may be stored in databases, files, reside in system flags, be communicated in non-persistant messages using a certain communication protocol, be retrieved from auxiliary sensors or information generators (like time), for example. In one embodiment, context may be stored in a repository such as a database, for example, and event detector 210 receives an event and uses event information to create queries to the database. Query results may be associated with the event for further event processing. The combined event information and associated context may then be used in interpreting the event. For example, internal event objects may be populated with both event information and context and forwarded to an interpreter component for analysis. However, it is to be understood that a variety of software structures could be used to organize the event information and associated context. Additionally, while accessing context has been described in this example as occurring in the event detector, it is to be understood that accessing context may be performed by other components such part of the interpreter or as part of a separate software component, module, or subroutine, for example.

In one embodiment, the system maintains a data structure that includes devices and associated activities (i.e., an activity list). The activity list may include a plurality of devices and an associated activity status for each device. The activity list may be included as part of the context, for example, and updated as new events are received or dispatched. For example, the activity list may be updated if a received event indicates that the status of a source device is busy. The activity list may also be updated if a new event is dispatched to a particular target device as described below. The activity list may be used for tracking the status of source systems, target systems, or both.

Event detector 210 is coupled to an event interpreter 220. Event interpreter 220 receives the event information and context, interprets the event based on the context and content, and generates other events that are sent to target devices. For example, interpreter 220 may receive the event information and context as a populated software structure. Alternatively, the event information or the context may be accessed by the interpreter using references (e.g., pointers) to particular storage locations, which are sent to interpreter 220 from event detector 210. Event interpreter 220 may analyze the content of the event, such as the content of a message, together with the context. A variety of algorithms may be applied to generate results useful in determining further actions to be performed in response to the received event. In one embodiment, event interpreter 220 assigns a priority to the event. Priority may be assigned to events based on the content of the event (e.g., the body of a message or data reading), other event information (e.g., event metadata), based on context, or combinations thereof. Assigning a priority to an event may be used to manage the execution of target devices, for example. Event interpreter 220 may signal the event detector to request more information from a particular source based on an evaluation of the information received. For example, execution of an algorithm on received event information and/or context may indicate that additional information may be needed or useful in making a decision. Event interpreter 220 may also receive the event information and update the context, for example, by storing the received event as part of the context.

In this example embodiment, interpreter 220 is coupled to a rule engine 240. Interpreter 220 may parse the event information, including the content, and forward particular portions of event information and/or event context to rule engine 240. Parsing strategies may vary based on the event information or context. For example, the parsing strategy may be dependent on the encoding of the content of an event (e.g., a message). The message can be a natural language text, an encoded software program, or an image (audio or graphical), for example. The parser may analyze the message in order to determine who will receive it, which priority it should have etc. Messages may range from single items like integers representing a temperature reading to very complex structures depending, for example, on the type of source device sending the event. The task of the parser may not be a complete analysis, but only so far as is required to get it to the right recipient, for example. Therefore, the parser may receive additional information (e.g., given by the context) about norms or further circumstances of the message. Accordingly, different parser strategies may be used on the basis of the encoding of the message, for example. In some applications, this encoding is directly related to the indication of the content type provided (optionally) in the event. It is to be understood that a parser may not exist in all cases. In many applications it may be sufficient for the interpreter to receive content information (e.g., where does the message come from) to assign priority. For example if a fire sensor triggers an event, a simple interpretation rule may say:

"if an event is received from this sensor, a very high priority is given and an alert is triggered at the mobile phone <some identifier>"

In this case the system may not look into the content of the event (e.g., the message), but may interpret the event on the basis of metadata only.

Rule engine 240 receives elements of the event information and context. Rule engine 240 may be coupled to a rule base for storing a plurality of rules. Rule engine 240 applies rules to the event information or context elements and generates results. A variety of rule types may be used to analyze the event information and context. For example, content rules may be used to operate on the content of the event (e.g., a message or data element). Content rules may perform semantic mappings, such as a mapping of a constituent of a message into another form (e.g., Fahrenheit to Celsius, meters to feet, or a document format conversion). Content rules serve to transform the content of a message. Content rules may translate encodings into other encodings either syntactically or using context-free and domain-free rules, for example. In general, the interpreter may apply content rules to achieve a form which is appropriate to make decision about priority assignment or recipient selection. For example, for web services or applications, an XML encoded message may be analyzed for tags that trigger rules to extract certain elements of the message for further use in the interpretation process while others are ignored. If a software application or service supplies a message, the address could be important for the determination of which device will receive the message. Another example may be a rule that looks at a tag indicating urgency of a message for setting a higher priority. Yet another content rule may indicate that a message is to be approved by taking further actions that require the message be sent to a particular destination. It is to be understood that a variety of content based rules could be specified.

Another type of rule may evaluate content with respect to a given domain ("domain rules"). A domain rule is a rule which associates certain features or values (e.g., constellations) with certain qualitative or quantitative consequences which may be only valid within a particular more or less defined realm. In contrast, a content rule is a rule that associates certain entities in a given form with another form of those entities (one variant is called a schema mapping). For example, if an event includes a temperature reading, then a domain rule may be as follows:

Rule: "if temperature>50 Celsius, then priority is high."

As another example of a domain rule, in a radar sensor application (domain), if an object comes closer than 50 feet, signal an alert (car domain). Alternatively, if an object comes closer than 5000 meters signal an alert (airplane domain). Note that in different domains different feature/value constellations lead to different consequences. As another example, in a nuclear power plant domain, if radioactivity level exceeds 800 Bequerel, then signal warning (medium priority). However, if the radioactivity level exceeds 1000 Bequerel, then signal alert (high priority). As yet another example of a domain rule, in a cell phone domain, if connection signal strength is low signal warning; and if the connection has been lost, then signal an alert.

Another example rule type is a context rule. A context rule associates certain feature or value constellations to consequences, and may take into account information from within the domain as well as from other domains making up the available context. These rules may or may not include event information and may or may not include results of other rules. An example context rule that includes context and content is as follows:

Rule: "If engine run time>3 hours, and outer temperature>30 Celsius, and sensor temperature>50 Celsius and <70 Celsius, then priority is medium"

For example, a sensor reading of the amount of gas in a gas tank may be detected as an event and interpreted by the interpreter. The event may indicate that the tank is half empty, which is usually not a problem (in the domain of gas filling). However, context information may indicate that the next gas station is very far away (e.g., while driving through the dessert). Accordingly, the domain constellation is overridden using the context information and an alert is triggered to fill up the tank. As another example, in a software application, an event indicating that a bill has been issued may be detected and evaluated. If it is a small amount, so it may have medium priority. However, context information may indicate that there are five other bills not paid yet, so an alert may be triggered, not so much because of the single bill at hand, but because of an arising problem beyond the domain of a bill. It is to be understood that the above rules, including content, domain, and context rules, could be implemented using a variety of computer programming techniques.

The results of one or more rules may be received by interpreter 220 from rule engine 240. Interpreter 220 may access interpretation rules for analyzing the results from rule engine 240. These rules are sometimes referred to as "meta-rules." Event interpreter 220 may access interpretation rules from a storage location 221. Interpretation rules may receive event information (e.g., event content), context, or the results of one or more rules from rule execution engine 240, or combinations of such information as defined by particular interpretation rules. The interpreter 220 may apply interpretation rules to translate received events into events to be transmitted to target devices to perform operations. For example, given event information and context, a specific device may be identified as a target for performing some further action. For instance, in response to receiving a particular event from a sensor, interpreter 220 may generate an event to be sent to an audio system. The event may be an audio alert telling a driver that the engine is about to overheat, for example. It is to be understood that a variety of events may be generated based on the interpretation rules or rule base, or both. In one embodiment, heuristic techniques are used to make decisions. For example, the results of rules in the rule engine or interpretation rules may be input to other rule engine or interpretation rules. A variety of iterative, recursive, or heuristic algorithms may be used for processing the events. In another embodiment, the rules are defined by a user or developer, and stored for use in controlling the system. Stored rules may allow lay users or software developers to tailor the combined systems to achieve desired functions or synergies.

In one embodiment, the event handler may include a list of associations between sources, targets, and one or more constraints. Such associations may be included as part of the context, for example, and accessed by the rule engine 240 or event interpreter 220 as needed. Rules may be specified for using this information. For example, a list of triples (e.g., [source, target, constraint(s)]) may be used to determine the target device to be used to perform a function in response to receiving a specific event from a particular source. An event for performing the function may be generated only if one or more specified constraints are satisfied, for example. In one embodiment, the constraints may specify priorities for the events sent to the target device.

Events generated by event interpreter 220 are managed by interrupt handler 250. Interrupt handler 250 is coupled to event management memory 255 and dispatch component 260. Event management memory 255 is a storage location for managing events. For example, interrupt handler 250 may receive an event from interpreter 220 to be performed by a particular target device. Interrupt handler 250 may store the event in a memory location for storing events yet to be done (i.e., a "to do" list), another memory location for events being executed (i.e., execution memory), and yet another memory location for interrupted events (i.e., an interrupt memory).

Interrupt handler 250 may also access the activity list described above to determine if the target device is available for receiving the event and performing the specified function. For example, if an event is receive from event interpreter 220, the event may first be placed in the "to do" memory. If the target device's activity status is busy (e.g., it is being used by another system), then the target device may not be able to receive and process the event, and the event may remain on the "to do" list until the target device's activity status changes to idle. However, if the target device's activity status is idle, the event may be forwarded to the target device, and an indicator may be stored in the memory allocated for tracking events currently being executed. In one embodiment, the memory allocated for tracking events being executed may include one location for each target device that an event has been sent to.

In one embodiment, interrupt handler 250 dispatches the event based on priority. For example, if interrupt handler 250 receives an event from event interpreter 220, interrupt handler 250 may check the priority of the event to determine further handling. If the event is directed toward a target device that is currently executing a previously dispatched event (e.g., as indicated by the execution memory allocation), and if the priority of the new event is higher than the priority of the event currently executing on the target device, the interrupt handler may interrupt the current event, execute the new event, and resume the interrupted event after the higher priority event is finished. For example, in one embodiment, the execution memory may include event information (or a reference thereto) including priority information. If a new event is received, interrupt handler 250 may compare the priority field (or attribute) of the new event with the priority of the event in the execution memory. If the new event has a higher priority, interrupt handler 250 may move the currently executing event out of the execution memory and store it in the interrupt memory. The system may then send an interrupt to the target device. In response to the interrupt, the target device may store state information locally so that it can resume the interrupted event at a later time, or the target device may send the state information back to the event handling system, for example. The newly received higher priority event may be placed in the execution memory, and the event dispatched to the target device for execution. When the higher priority event is completed, the event in the interrupt memory may be transferred back to the execution memory, and the event resumed at or near the state it was interrupted.

Dispatch component 260 may be used to format events so the events may be understood by target devices 280A-N. It is to be understood that one or more target devices may also be source devices. In some applications, the source device and target device may be the same device. Alternatively, source devices may be substantially different than the target devices, and may include more or less intelligence, processing power, or functionality and receive events in substantially different formats, for example. In one embodiment, the dispatch component includes associations between target devices and communication protocols for sending events to each particular target device. For example, an event may be received by the dispatch component specifying a particular target device. The dispatch component may determine a particular protocol, such as a particular API, for example, for sending the event to the target. The dispatch component may translate the event into the required format or invoke a particular code routine for sending the event to the target to perform the desired function. In one embodiment, the dispatch component maintains a data structure including each target device name and communication specifications (e.g., (target_name, api_specification)). The data structure may be used to send output events to different target devices using the required protocol with all parameters required to carry out the desired function.

Figure 3A:
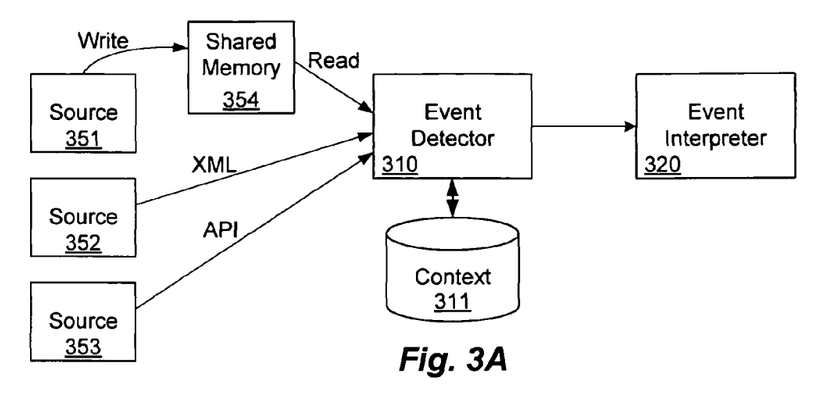
FIG. 3A-B illustrates an example of receiving and processing events from a plurality of source systems according to one embodiment of the present invention.
Figure 3B:
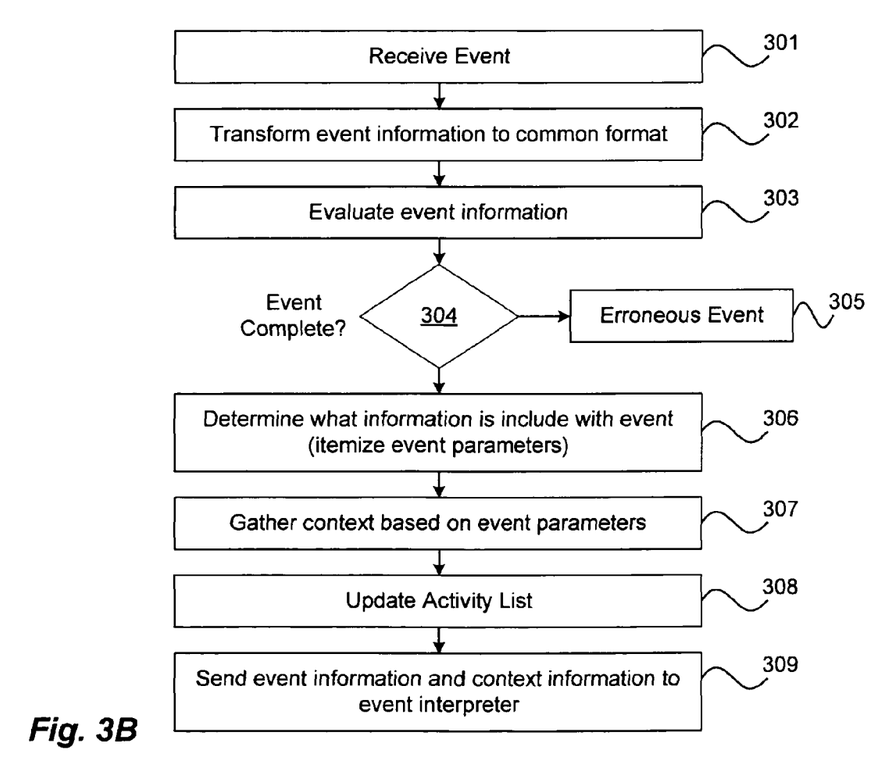

FIG. 3A-B illustrates an example of receiving and processing events from a plurality of source systems according to one embodiment of the present invention. FIG. 3A illustrates the event inputs to an event handler from a plurality of source system 351-353 according to an embodiment of the present invention, and FIG. 3B illustrates an event handling process that may be used. As illustrated in FIG. 3B, events are received from one or more source systems at 301. Events may be received from a variety of source systems 351-353 using a variety of different techniques. For example, source system 351 may write event information to a shared memory 354 (e.g., a virtual blackboard), and event detector 310 may read the event information from the shared memory. Alternatively, source 352 may send event information as XML documents, which may be received by event detector 310. As another example, event detector 353 may detect event information from source 353 using an application program interface ("API"). In particular, event detector 310 may include code that listens for events generated by source systems. Event information may be received in a variety of different formats and transformed at 302 into a common format, for example. At 303, the event information is evaluated. The event information may be checked to verify the validity of the first event. Criteria may be defined to determine whether or not the event is valid. For example, if the event information does not include the name of the source system generating the event, the event may be considered invalid or incomplete. If an event from a simple device does not include, at a minimum, an event descriptor (e.g., possibly used for identifying the source) and event data (content), then the event may be considered invalid. Different criteria may be defined for determining validity of an event based on a variety of parameters including, but not limited to, the source system generating the event, message type, or priority, for example. In some implementations, event evaluation and checking may also be performed by the interpreter, for example. If the event is determined to be incomplete at 304, the event may be designated as an erroneous (invalid) event at 305. However, if the event is complete (valid), then the event information may be examined. For example, at 306 the system may determine what information is included with the event (e.g., itemize the event parameters). At 307 the system may gather context based on the event information. For example, the system may use the received event parameters to access associated context information corresponding to the event. As described above, a variety of context information may be stored in a memory or repository, such as a context database 311, for example. At 308 the system may update the activity list. For example, if the source includes activity status information in the event information, the event detector may use such information to update the activity list in the event handler as appropriate. If an event includes an indication that the source is idle, for example, the event detector may receive the event and update the activity list to indicate that the particular source is currently idle. At 309, the event information and context information are sent to the event interpreter 320.

Figure 4:
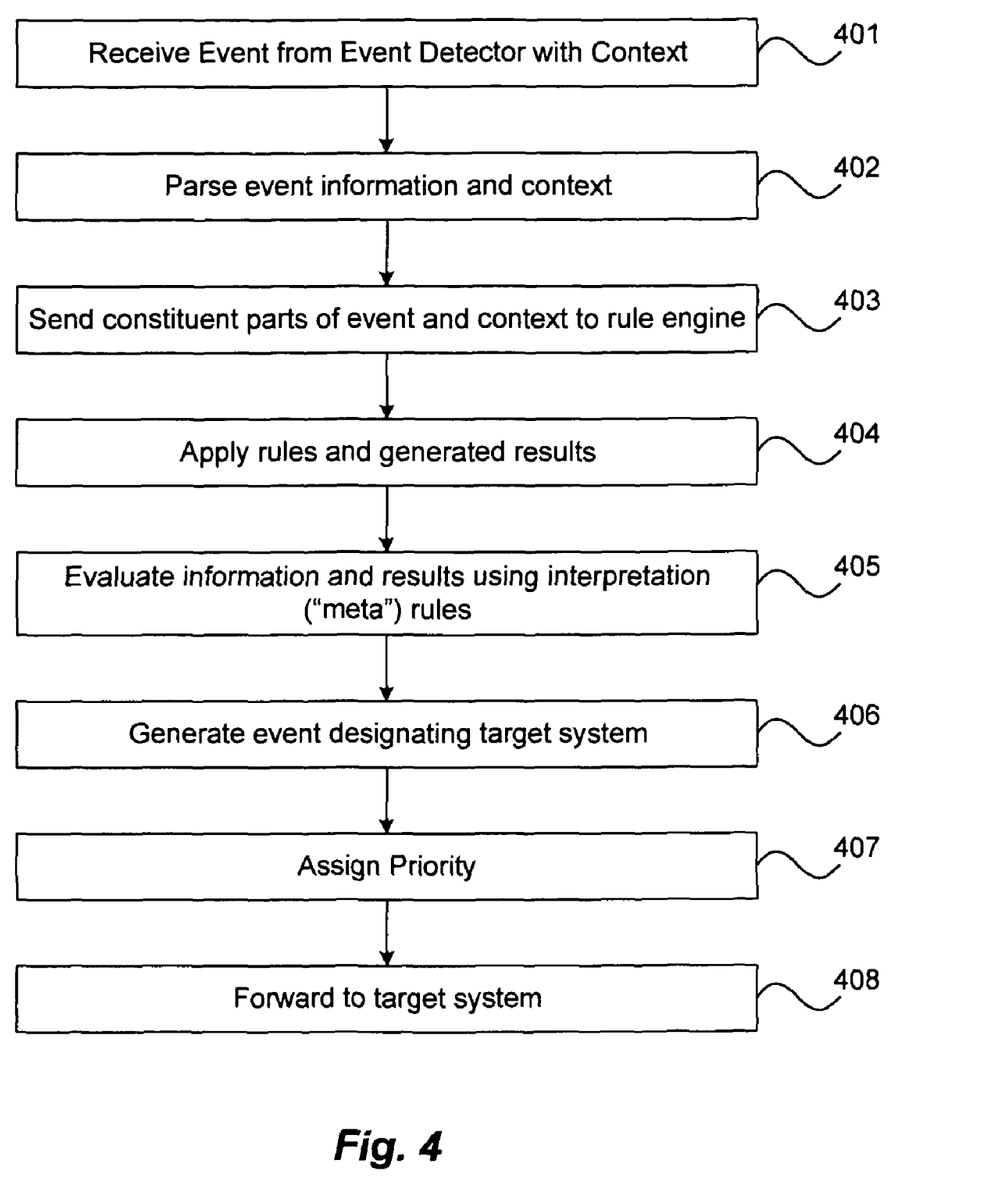
FIG. 4 illustrates an example of processing event information and context according to one embodiment of the present invention.

FIG. 4 illustrates an example of processing event information and context according to one embodiment of the present invention. Processing may be performed in whole or in part by an interpreter, for example. At 401 event information and context information are received from the event detector. At 402 the event information may be parsed into a plurality of components. The context information may also be parsed into components at 402. In one embodiment, one or more of the components of information are provided as inputs to the one or more rules. For example, at 403 constituent parts of the event information and/or context information are sent to a rule engine. At 404 the rules are applied and results generated. As mentioned above, the rules may be semantic mappings that translate event or context information components into information meaningful to the interpreter. For instance, the results generated by the rule engine may be used as inputs to interpretation rules, which are sometimes referred to as meta-rules. Accordingly, at 405 some or all of the event information, context information, or results from the rule engine, or combinations thereof, may be evaluated using interpretation rules. The interpreter may then determine further activities to be performed by the same source system or another target system. Accordingly, the interpreter may generate one or more events designating a target system at 406. The output events may be generated based on at least a portion of the event information and context information, and results from one or more rules. The event may be forwarded to a target system to perform a particular activity. In one embodiment, a priority may be assigned to the output event at 407. At 408, the output event may be forwarded to the target system, which as mentioned above may be the same system that generated the input event.

Figure 5:
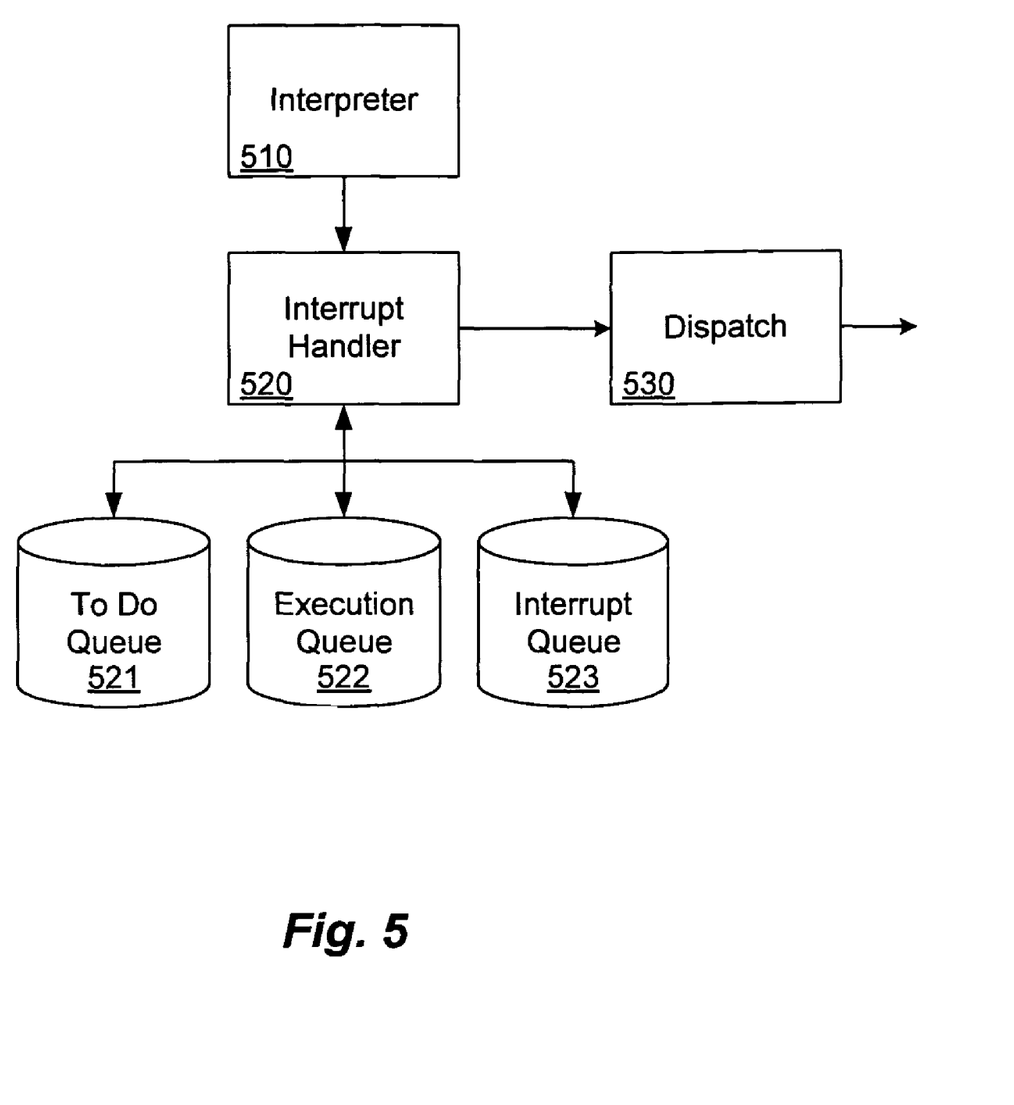
FIG. 5 illustrates an example of event management according to one embodiment of the present invention.

FIG. 5 illustrates an example of event management according to one embodiment of the present invention. Output events generated by interpreter 510 may be received by interrupt handler 520. Interrupt handler 520 may be coupled to a memory system for managing events. In this example, three memory queues 521, 522, 523 are used to manage output events. Outward bound events may be managed by a memory indicating that the event is waiting to be executed (i.e., the TO DO memory). In this example, the system may store a value corresponding to the event in a memory location indicating that the event is waiting to be executed. This may include storing the actual event in a memory location in TO DO queue 521, or this may include storing a value representing the event in the TO DO queue. Events in the TO DO queue are waiting to be executed by the target systems.

Output events may also be managed by a memory indicating that the event is executing on a target system (i.e., the execution memory). When the event is executing the system may store a value corresponding to the event in a memory location indicating that the event is executing. For example, the event may be received by interrupt handler 520, and interrupt handler 520 may check the activity status of the target system designated to receive the event before sending the event to the target system. If the activity status is idle, or the target system is otherwise indicated as available for processing the event, then the event is sent to the target system via dispatch component 530. In this example, interrupt handler 520 may store a value corresponding to the event in execution queue 522 indicating that the event is executing. In one embodiment, each target system that the event handling system may send events to has a memory location (e.g., in queue 522) for tracking execution. For example, if the system has sent ten (10) events to ten (10) different systems for execution, execution queue 522 may include ten (10) separate memory locations—one for each target executing an event. If another event is sent to another target, a new memory location corresponding to the new target performing the execution may be established. Accordingly, execution queue 522, or an equivalent memory system, may be used to manage the events executing on the different target systems. When an event has been completed, the target system may communicate with the dispatch component, for example, to indicate that event execution is at an end, and the corresponding memory location in execution queue may be cleared and reused for a new event for the same target or allocated to another target for another event. In one embodiment, all events may first be placed in the TO DO queue, but in some embodiments events could be transmitted directly to idle target systems and placed directly in the execution queue.

Interrupt handler 520 may further store a value corresponding to an event in a memory indicating that the event has been interrupted. For example, if an event is executing on a target system, and another event with a higher priority is generated that designates the same target, the system may issue a command instructing the target system to halt, store state information for the currently executing event, and then store a value in an interrupt queue 523 indicating that the event has been interrupted. The value stored may include the interrupted event itself, state information from the target system, or another digital value referencing other information that may be used to track and restart the event when the interrupt is cleared. A value corresponding to the higher priority event may be entered into the execution queue location corresponding to the particular target, and the dispatch component may send the higher priority event for execution on the target system.

From the above, it can be seen that interrupt handler may manage events generated by the system for controlling the functions carried out by target systems. As events are received and executed, they may be interrupted by higher priority events and placed on the interrupt queue. Events may remain in the TO DO queue or interrupt queues as long as higher priority events are received for execution. A variety of priority levels may be defined. Priority levels assigned to events may be used to determine when executing events are to be interrupted, when interrupted tasks are to be resumed, or when events on the TO DO queue are to be sent for execution.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    storing context information, the context information corresponding to a plurality of different types of source systems, wherein the different types of source systems generate different types of events and correspond to different stored context information, the stored context information comprising information about the source systems and a plurality of triples, each triple comprising a particular source system, a particular associated target system, and an associated constraint, wherein events received from a particular source system are sent to an associated target system if the associated constraint is satisfied;
    receiving, on at least one computer, a first event from a first source system in the plurality of source systems, the first event including event information comprising information identifying the source of the first event;
    accessing, by the at least one computer, the context information corresponding to the first event using the event information, wherein the accessed context information comprises the first source system, a first target system, and a first constraint;
    generating a second event based on at least a portion of the event information and context information using one or more rules;
    assigning a priority to the second event; and
    sending the second event to a first target system in a plurality of target systems to perform a particular operation on the first target system if the event information in the first event satisfies the first constraint.

2. The method of claim 1 wherein the event information comprises event content and other information about the event.

3. The method of claim 2 wherein the second event is generated and the priority is assigned based on the content of the first event.

4. The method of claim 1 further comprising checking the event information and verifying the validity of the first event.

5. The method of claim 1 further comprising parsing the event information into a plurality of components and providing one or more of the components as inputs to the one or more rules.

6. The method of claim 1 wherein the rules comprise semantic mappings.

7. The method of claim 1 wherein a first plurality of rules receive at least a portion of event information and context information, and in accordance therewith, generate results, and wherein the results are processed by one or more second rules to generate the second event and assign said priority to the second event.

8. The method of claim 1 wherein priority is assigned based on at least a portion of the event information and context information.

9. The method of claim 1 further comprising storing a value corresponding to the second event in a memory location indicating that the second event is waiting to be executed.

10. The method of claim 1 further comprising storing a first value corresponding to the second event in a first memory location indicating that the second event is executing.

11. The method of claim 10 wherein the first memory location corresponds to the first target system.

12. The method of claim 10 further comprising generating a third event having a higher priority than the second event, wherein if the second event is executing, the first value corresponding to the second event is stored in a second memory location indicating that the second event has been interrupted, and a second value corresponding to the third event is stored in the first memory location.

13. The method of claim 1 further comprising updating an activity status of the first source system.

14. The method of claim 1 further comprising checking an activity status of the first target system before sending the second event to the first target system.

15. The method of claim 1 wherein the constraint assigns said priority to the second event.

16. The method of claim 1 further comprising converting the second event to conform to a protocol of the first target system.

17. An event handling system comprising:
    at least one computer;
    an event detector, operable on the at least one computer, for receiving first events from a plurality of source systems, the first events comprising event information, the event information comprising information identifying the sources of the first events;
    a context repository for storing context information, the context information corresponding to a plurality of different types of source systems, wherein the different types of source systems generate different types of events and correspond to different stored context information;
    an event interpreter, operable on the at least one computer, for receiving event information and context information, and in accordance therewith, generating second events and assigning priority to the second events based on at least a portion of the event information and context information, wherein the received context information comprises information about the source systems and a plurality of triples, each triple comprising a particular source system, a particular associated target system, and an associated constraint, wherein events received from a particular source system are sent to an associated target system if the associated constraint is satisfied; and
    a dispatch component for sending the second events to one or more designated target systems to perform a particular operation on the one or more designated target systems based on the event information in the received events.

18. The event handling system of claim 17 further comprising:
    an interrupt handler; and
    a first queue for storing first values corresponding to events waiting to be executed;
    a second queue for storing second values corresponding to events that are executing on target devices; and an third queue for storing third values corresponding to events that have been interrupted by higher priority events.

19. The event handling system of claim 17 further comprising a rule execution engine and a plurality of rules, the rule execution engine receiving components of the event information and context information, and in accordance therewith, generating results.

20. The event handling system of claim 19 wherein the rules comprise semantic mappings.

21. The event handling system of claim 19 further comprising a plurality of interpretation rules for generating the second events and assigning priority based on event information, context information, or the results from the rule execution engine.

22. A non-transitory computer-readable medium containing instructions for controlling a computer system to perform a method, the method comprising:
storing context information, the context information corresponding to a plurality of different types of source systems, wherein the different types of source systems generate different types of events and correspond to different stored context information, the stored context information comprising information about the source systems and a plurality of triples, each triple comprising a particular source system, a particular associated target system, and an associated constraint, wherein events received from a particular source system are sent to an associated target system if the associated constraint is satisfied;
receiving, on at least one computer, a first event from a first source system in the plurality of source systems, the first event including event information comprising information identifying the source of the first event;
accessing, by the at least one computer, the context information corresponding to the first event using the event information, wherein the accessed context information comprises the first source system, a first target system, and a first constraint;
generating a second event based on at least a portion of the event information and context information using one or more rules;
assigning a priority to the second event; and
sending the second event to a first target system in a plurality of target systems to perform a particular operation on the first target system if the event information in the first event satisfies the first constraint.

23. The non-transitory computer-readable medium of claim 22 wherein the event information comprises event content and other information about the event, and wherein the second event is generated and the priority is assigned based on the content of the first event.

24. The non-transitory computer-readable medium of claim 22, the method further comprising parsing the event information into a plurality of components and providing one or more of the components as inputs to the one or more rules.

25. The non-transitory computer-readable medium of claim 22 wherein a first plurality of rules receive at least a portion of event information and context information, and in accordance therewith, generate results, and wherein the results are processed by one or more second rules to generate the second event and assign said priority to the second event.

26. The non-transitory computer-readable medium of claim 22, the method further comprising storing a value corresponding to the second event in a memory location indicating that the second event is waiting to be executed.

27. The non-transitory computer-readable medium of claim 22, the method further comprising storing a first value corresponding to the second event in a first memory location indicating that the second event is executing.

28. The non-transitory computer-readable medium of claim 27, the method further comprising generating a third event having a higher priority than the second event, wherein if the second event is executing, the first value corresponding to the second event is stored in a second memory location indicating that the second event has been interrupted, and a second value corresponding to the third event is stored in the first memory location.

* * * * *